United States Patent [19]
Xiang

[11] Patent Number: 5,936,856
[45] Date of Patent: Aug. 10, 1999

[54] METHOD AND APPARATUS FOR ACTIVE COMMON-MODE VOLTAGE COMPENSATION IN INDUCTION MOTOR SYSTEMS

[75] Inventor: Youqing Xiang, Fort Smith, Ark.

[73] Assignee: Baldor Electric Companh, Ft. Smith, Ark.

[21] Appl. No.: 09/023,312

[22] Filed: Feb. 13, 1998

[51] Int. Cl.[6] .............................. H02J 1/02; H02M 3/24; H01F 27/42
[52] U.S. Cl. ............................. 363/98; 363/39; 323/356
[58] Field of Search .................................. 363/37, 39, 40, 363/41, 98, 131, 132; 323/356

[56] References Cited

U.S. PATENT DOCUMENTS

| | | | |
|---|---|---|---|
| 4,437,050 | 3/1984 | Overzet | 318/798 |
| 4,680,526 | 7/1987 | Okuyama et al. | 318/802 |
| 4,903,185 | 2/1990 | Fiorina et al. | 363/98 |
| 5,309,346 | 5/1994 | Gyugyi | 363/54 |
| 5,321,598 | 6/1994 | Moran | 363/98 |
| 5,568,371 | 10/1996 | Pitel et al. | 363/39 |
| 5,646,498 | 7/1997 | Lipo et al. | 318/800 |
| 5,657,213 | 8/1997 | Bjorklund et al. | 363/39 |
| 5,661,390 | 8/1997 | Lipo et al. | 318/803 |
| 5,751,138 | 5/1998 | Venkata et al. | 323/207 |

OTHER PUBLICATIONS

D. Rendusara, New Inverter Output Filter Configuration Reduces Common Mode and Differential Mode dv/dt at the Motor Terminals in PWM Drive Systems, IEEE (1997).

Giovanna Oriti, A New Space Vector Modulation Strategy for Common Mode Voltage Reduction, IEEE (1997).

Shaotang Chen, Modeling of Motor Bearing Currents in PWM Inverter Drives, IEEE (1995).

Jay Erdman, Effect of PWM Inverters on AC Motor Bearing Current and Shaft Voltagesm IEEE (1995).

Satoshi Ogasawara, Modeling and Damping of High–Frequency Leakage Currents in PWM Inverter–Fed AC Motor Drive Systems, IEEE (1996).

A.L. Julian, Elimination of Common Mode Voltage in Three Phase Sinusoidal Power Converters, IEEE.

Jih–Sheng Lai, Multilevel Converters—A New Breed of Power Converters, IEEE IAS Annual Meeting, Orlando, FL (Oct. 1995).

Gautam Sinha, A Four Level Rectifier–Inverter System for Drive Applications, IEEE (Sep. 1996).

*Primary Examiner*—Robert E. Nappi
*Assistant Examiner*—Bao Q. Vu
*Attorney, Agent, or Firm*—Arnold, White & Durkee

[57] ABSTRACT

A method and apparatus for compensating for common mode voltages in the output of PWM inverters in induction motor systems is disclosed. In one embodiment, a common mode sensing circuit is coupled to the output of a three-phase inverter to detect common mode voltages in the output. A common mode sensing signal generated by the common mode sensing circuit is applied to a multi-level comparator circuit to generate a plurality of gate driving signals. The gate driving signals are used to control a single-phase multi-level half-bridge inverter circuit to generate a compensation signal that is injected by transformer coupling into the PWM inverter output.

9 Claims, 12 Drawing Sheets

METHOD AND APPARATUS FOR ACTIVE COMMON-MODE VOLTAGE COMPENSATION IN INDUCTION MOTOR SYSTEMS

FIELD OF THE INVENTION

This invention relates generally to the field of induction motor drive systems, and more particularly to pulse width modulation inverters for induction motor drive systems.

BACKGROUND OF THE INVENTION

Using fast switching power semiconductor devices, such as insulated gate bipolar transistors (IGBTs), a pulse width modulation (PWM) inverter can be operated at high frequency (for example, up to 20 kHz), significantly improving motor performance. High-performance induction motor drives require such fast switching transition and high switching frequency from PWM inverters to fully realize such advantages as fast dynamic response, high efficiency, and low acoustic noise.

There are some perceived problems with high-speed switching, however. During the high-speed switching of the IGBTs, charging and discharging current can sometimes flow through a complex distributed capacitance inherently associated with the switching system. Such transient charging/discharging current can flow through the distributed capacitance to the motor and return to the power mains along various paths. This well-known and well-understood phenomenon is typically referred to as "high dv/dt common mode current" or "high dv/dt common mode voltage," and is generally regarded as undesirable.

High dv/dt common mode voltages and currents caused by high-speed switching can lead to premature motor winding insulation failure and/or motor bearing failure. The high speed voltage and/or current changes which lead to high dv/dt common mode voltages and currents occur at every switching instant of the IGBTs; hence, the phenomenon worsens as switching frequency increases.

Experimental investigation has shown that common-mode dv/dt generated by PWM voltage source inverting (VSI) is closely related to shaft voltage and bearing current in a driven motor. (As would be appreciated by those of ordinary skill in the art, "bearing current" refers to spurious and undesirable current flow through motor bearings when operated under pure sine wave or PWM inverter sources. See, e.g., Erdman, et al., "Effect of PWM Inverters on AC Motor Bearing Currents and Shaft Voltages," *IEEE Trans. Industry Applications*, vol. 32, no. 2, pp. 250–259, 1995. Premature bearing failure is related to the bearing current resulting from the interaction between common-mode voltage and parasitic capacitance in the motor.

Passive solutions have been sought for the problems associated with differential mode and common mode dv/dt in PWM induction motor drive systems. See, e.g., Rendusara et al., "New Inverter Output Filter Configuration Reduces Common Mode and Differential Mode dv/dt at the Motor Terminals in PWM Drive Systems," *Record of the 28th IEEE Power Electronics Specialists Conference* (PESC '97), Jun. 22–27, 1997, pp. 1269–1275.

There have been various proposed other passive methods of dealing with the problems of common mode and differential mode dv/dt, including shaft grounding, bearing isolation, and conductive grease. None of these techniques has proven to be entirely effective.

The above-cited Erdman et al. reference proposes shielding the stator winding as a method of address problems with bearing currents. This method, while possibly effective, would tend to be undesirably expensive in practice.

In addition to passive solutions, active solutions have also been proposed. Sinha et al., "A Four Level Rectifier-Inverter System for Drive Applications," *Conf. Record of IAS 96*, pp. 980–981 (1996) proposes using an additional phase leg to control the neutral point voltage of induction motors. See also, Lipo et al., "Elimination of Common Mode Voltage in Three Phase Sinusoidal Power Converters," *Proceedings of PESC '96— 26th Annual IEEE Power Electronics Specialists Conference*, Baveno, Italy, Jun. 24–27, 1996, pp. 1968–1972.

Seeking to reduce the common-mode ground leakage current of PWM inverter-fed induction motors, there has been proposed a series of methods based on the common mode choke and transformer. See, e.g., Ogasawara et al., "Modeling and Damping of High-Frequency Leakage Currents in PWM Inverter-Fed AC Motor Drive Systems," *IEEE Trans. on Industry Applications*, vol. 32, no. 5, 1996, pp. 1105–1114, and Ogasawara et al., "An Active Circuit for Cancellation of Common-Mode Voltage Generated by a PWM Inverter," *Record of the 28th Annual IEEE Power Electronics Specialists Conference*, vol. 2, 1997, pp. 1547–1553. The "active common noise canceller" proposed in this latter Ogaswara et al. reference appears to show the successful cancellation of common mode voltages. However, this approach employs an emitter follower, which can be difficult to implement for high-voltage applications.

SUMMARY OF THE INVENTION

To reduce or cancel common-mode voltages in induction motor systems, there is disclosed herein an active common-mode compensator consisting of a single-phase multi-level half-bridge inverter (SPMHI) and a common-mode transformer. The disclosed compensator is capable of canceling common-mode voltages based upon the switching operation of power semiconductor devices for loss reduction. The disclosed compensator can be integrated into a PWM voltage source inverter for new applications, and can be designed as a standalone unit for retrofit applications.

BRIEF DESCRIPTION OF THE DRAWINGS

Various features and aspects of the present invention will perhaps be best understood with reference to a detailed description of a specific embodiment of the invention, when read in conjunction with the accompanying drawings, wherein:

FIG. 4b is a plot of the frequency spectrum of the high frequency component signal and a plot of the frequency spectrum of the common mode voltage signal from FIG. 4a;

DETAILED DESCRIPTION OF A SPECIFIC EMBODIMENT OF THE INVENTION

Figure 1:
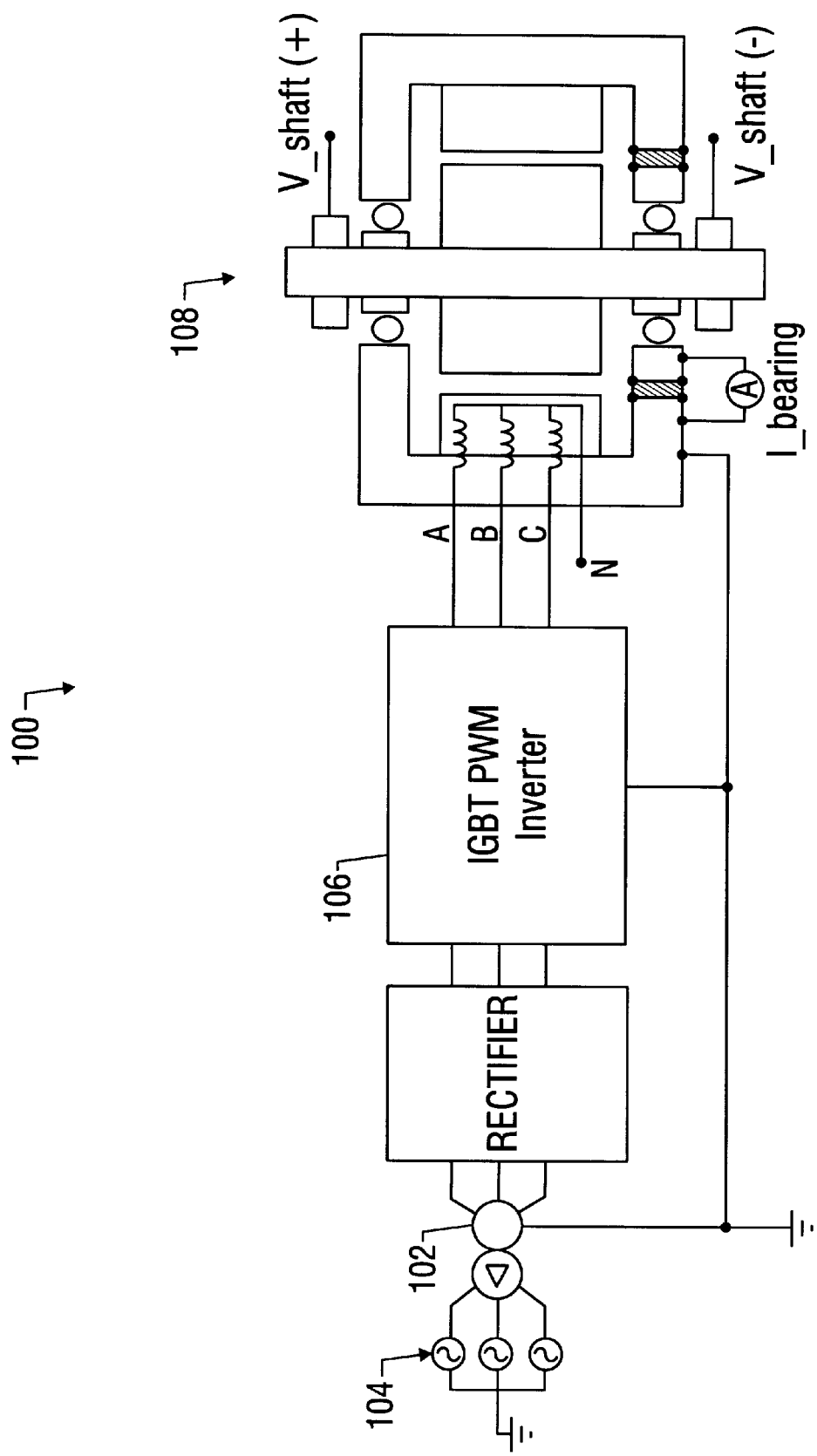
FIG. 1 is a schematic diagram of an induction motor system with which the present invention may be advantageously practiced.

Referring to FIG. 1, there is shown an induction motor system 100 generally in accordance with the prior art. System 100 in FIG. 1 consists of a delta-wye connected isolation transformer 102 connected to a source of power 104, an insulated gate bipolar transistor (IGBT) voltage/frequency (V/Hz) inverter 106, and a modified induction motor 108 having bearing isolation and neutral access (N). In FIG. 1, the motor shaft is designated with reference numeral 110, and the bearings are designated with reference numerals 112.

Figure 2A:
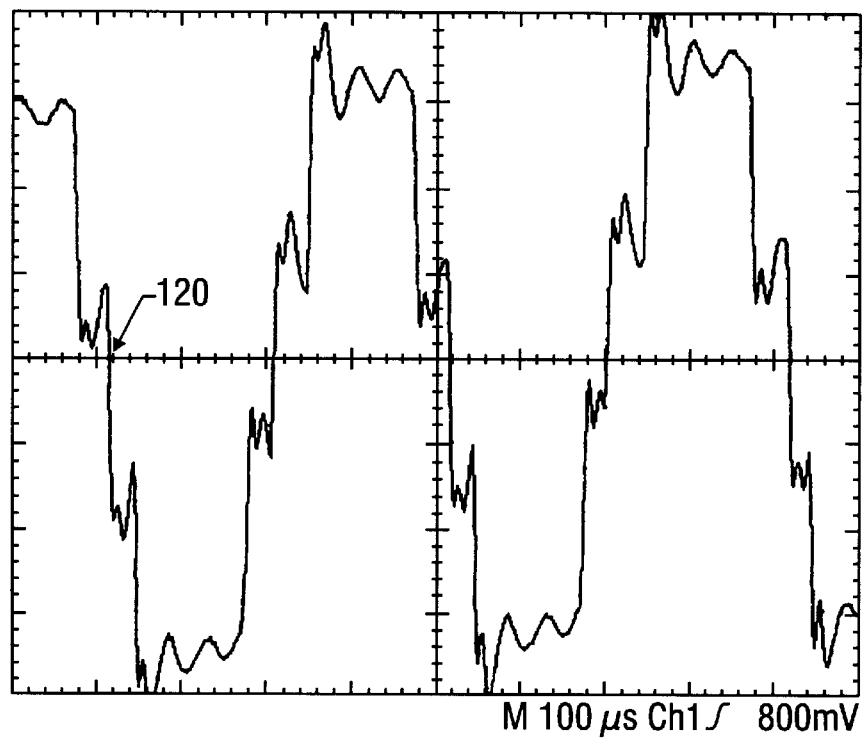
FIG. 2a is a plot of the neutral-to-frame voltage in the system of FIG. 1.
Figure 2B:
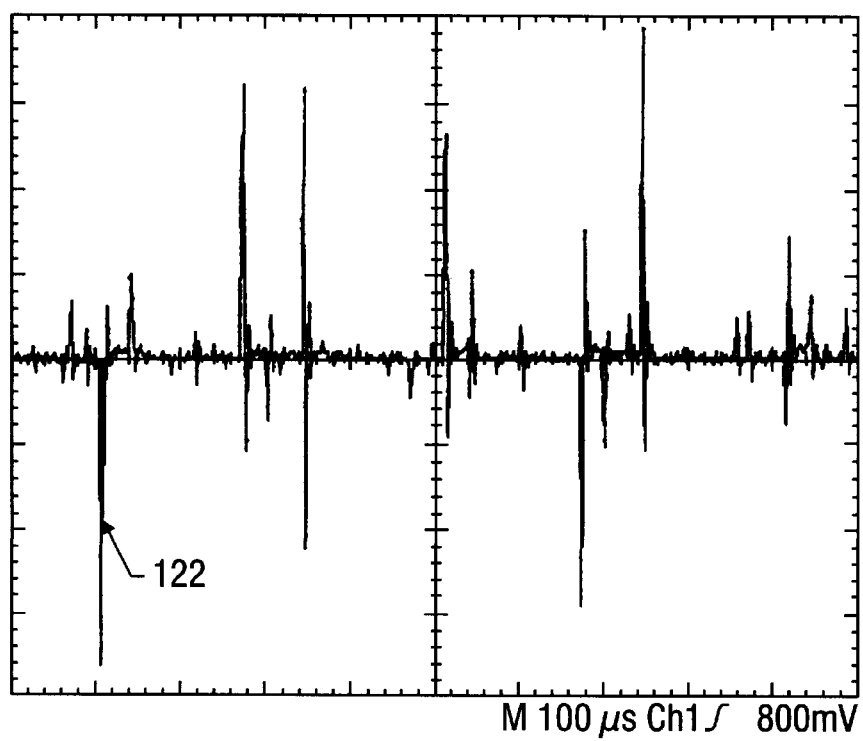
FIG. 2b is a plot of the shaft voltage in the system of FIG. 1.

FIG. 2a is a plot of the winding neutral voltage relative to the motor frame for the system of FIG. 1. FIG. 2b is a plot of the shaft voltage, i.e., the voltage differential between V_shaft(+) and V_shaft(−) as designated in FIG. 1. Finally, FIG. 2c presents another plot of the shaft voltage (the waveform designated with reference numeral 116 in FIG. 2c), and a plot of the bearing current (the waveform designated with reference numeral 118 in FIG. 2c).

From FIGS. 2a and 2b, it can be seen that the shaft voltage pulses (FIG. 2b) are tightly correlated to transitions of the winding neutral voltage (FIG. 2a). For example, for the winding neutral voltage transition designated with reference numeral 120 in FIG. 2a correlates with the pulse(s) designated generally with reference numeral 122 in FIG. 2b. Those of ordinary skill in the art will observe similar correlations between transitions in the waveform of FIG. 2a and pulses in the waveform of FIG. 2b.

Figure 2C:
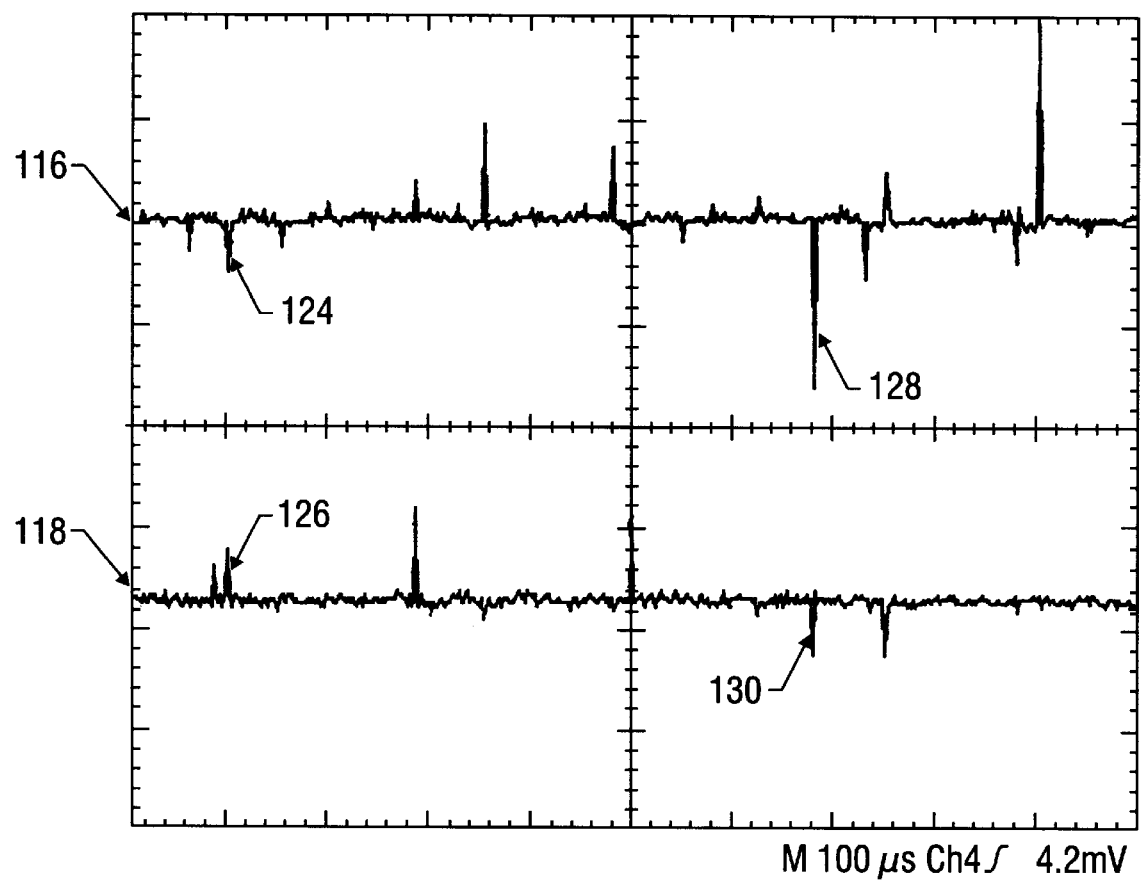
FIG. 2c is a plot of the shaft voltage and the bearing current in the system of FIG. 1.

Also, from FIG. 2c, it can be seen that bearing current pulses are generally correlated to shaft voltage pulses. For example, a correlation can be observed between pulse 124 in waveform shaft voltage waveform 116 and pulse 126 in shaft current waveform 118, and between pulse 128 in waveform 116 and pulse 130 in waveform 118.

Thus, from FIGS. 2a, 2b, and 2c, it can be seen that common-mode voltages generated in PWM inverters are most likely one of the major causes for bearing currents and shaft voltages of PWM VSI-fed induction motors.

Figure 3:
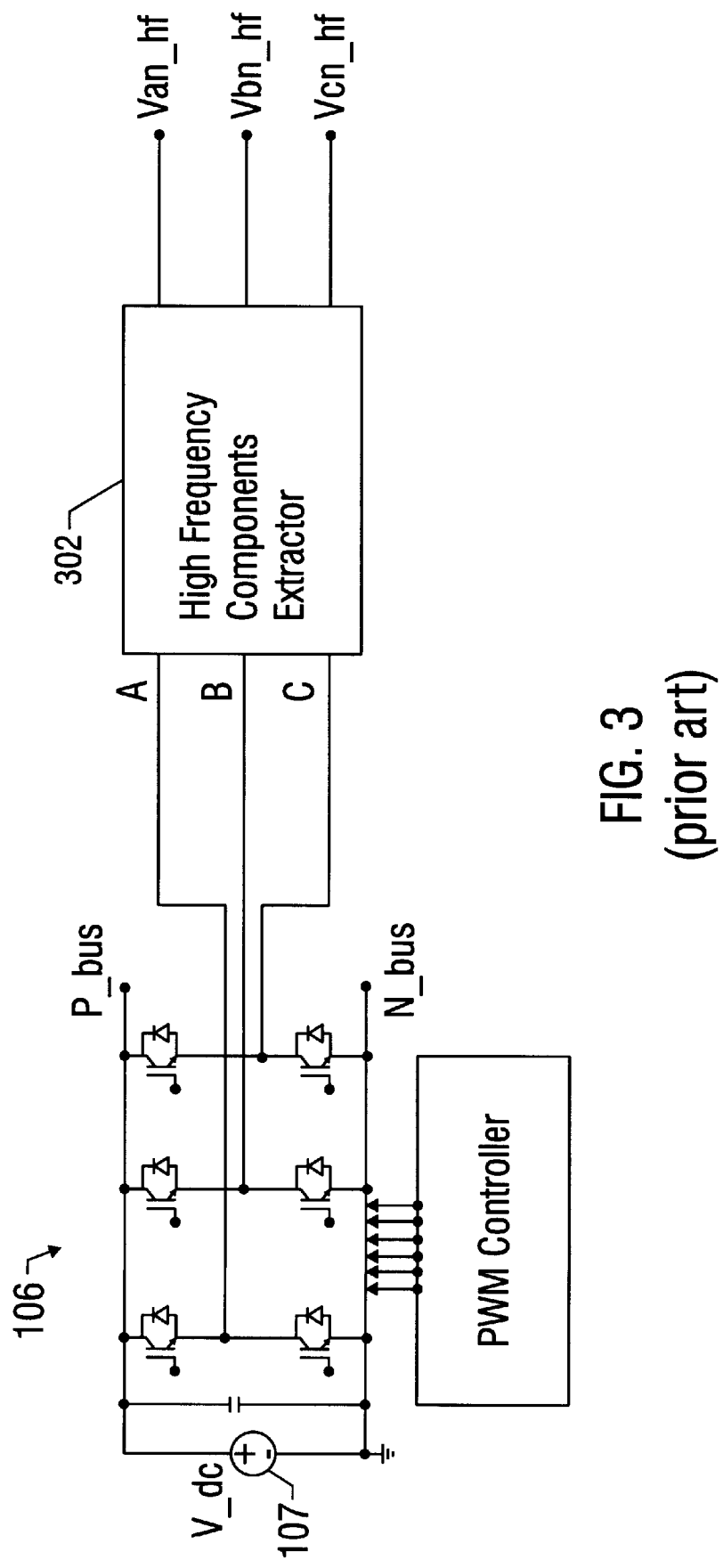
FIG. 3 is a schematic diagram of a high-frequency model for the inverter in the system of FIG. 1.

The pulse-type shaft voltage and bearing current waveforms of FIGS. 2a, 2b, and 2c suggest that analysis modeling of the high-frequency behavior of PWM VSI-fed induction motors can provide insight into a how common mode voltages can be rejected. FIG. 3 illustrates one method for extraction of high-frequency components from inverter 106 from the system 100 of FIG. 1 (it is to be understood that the diode bridge portion of inverter 106 is not shown, instead being represented by DC voltage source 107 in FIG. 3).

As shown in FIG. 3, the three phase output {A, B, C} from inverter 106 is provided to a high frequency component extractor 302, which those of ordinary skill in the art will appreciate can be essentially a high-pass filtering circuit. This results in the generation of three high-frequency signals Van_hf, Vbn_hf, and Vcn_hf respectively representing the high-frequency components of the three phases {A, B, C} of the output of inverter 106.

Figure 4A:
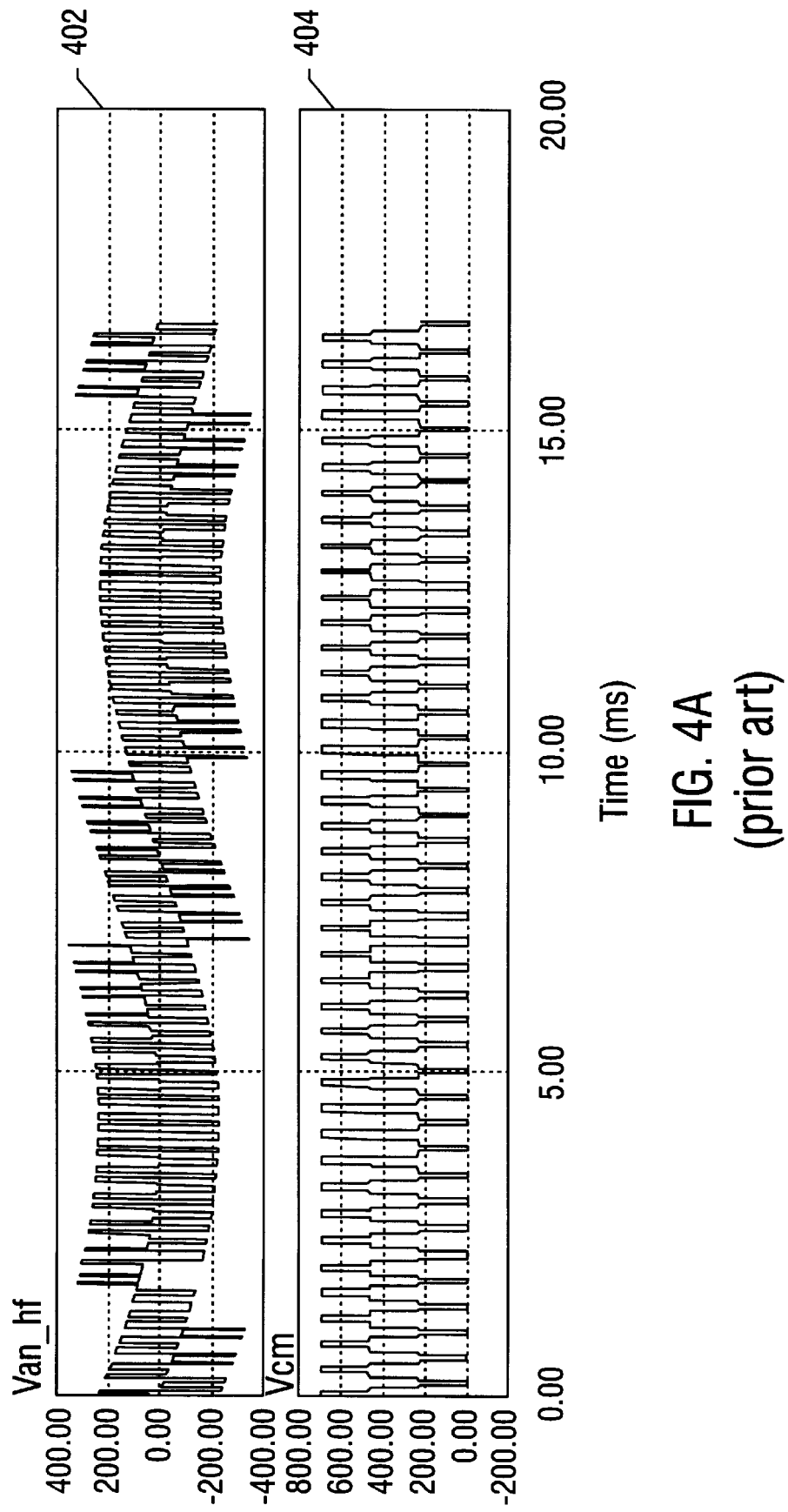
FIG. 4a is a plot of the extracted high frequency and common mode components of one phase of the output of the inverter from FIGS. 1 and 3.

FIG. 4a presents plots of the high-frequency component Van_hf of phase A of the PWM inverter output (waveform 402 in FIG. 4a) as well as the common-mode voltage V_cm (waveform 404 in FIG. 4a) from the circuit of FIG. 3, where the common mode voltage V_cm is measured between the nodes designated A and N_bus in the circuit of FIG. 3.

Figure 4B:
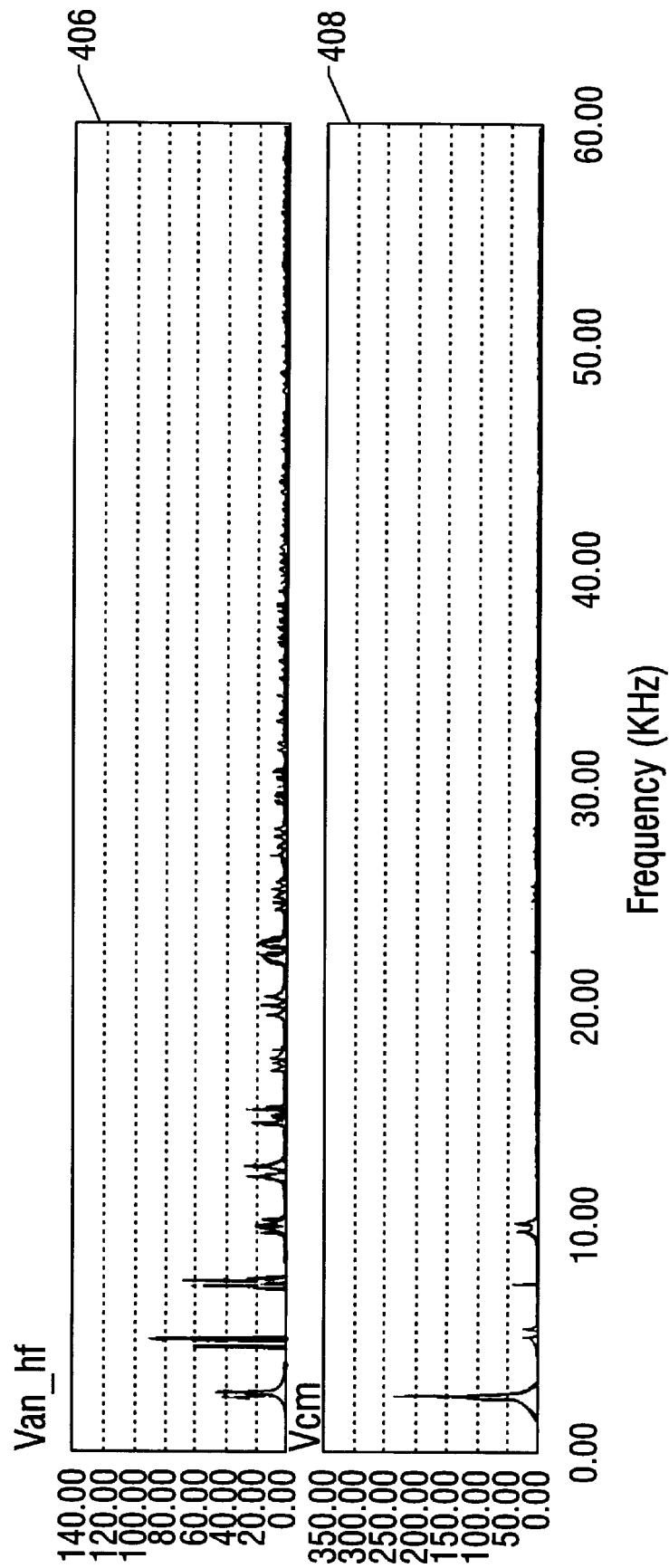

FIG. 4b presents plots of the frequency content of the Van_hf and V_cm signals from FIG. 4a (waveform 406 being the frequency plot of Van_hf and waveform 408 being the frequency plot of V_cm).

Figure 5:
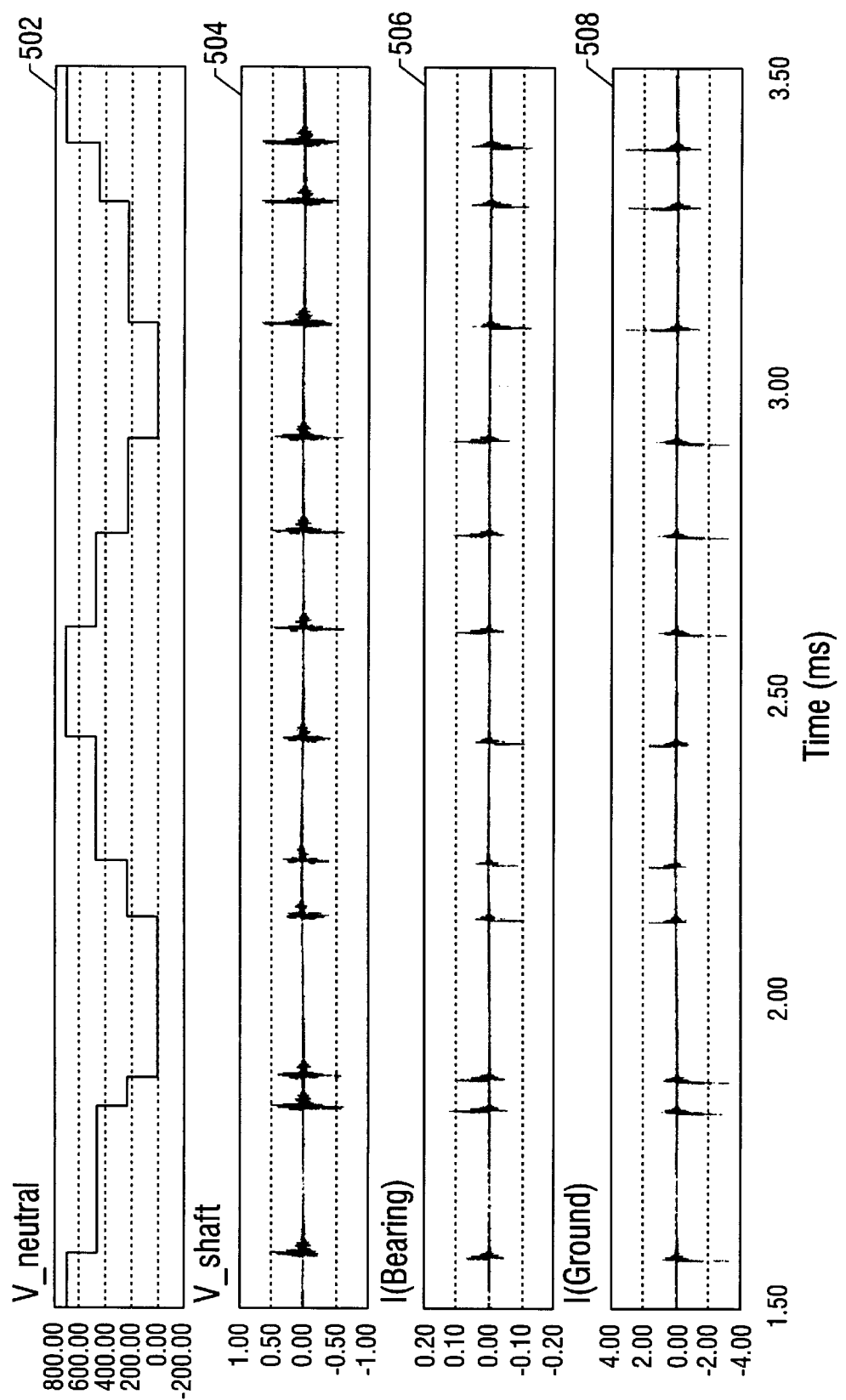
FIG. 5 shows plots of various voltage and current waveforms existing in the system of FIG. 1.

In FIG. 5, there are presented several waveforms representing currents and voltages in the system of FIG. 1. In particular, waveform 502 in FIG. 5 represents the neutral voltage V_neutral, measured between neutral and N_bus. Waveform 504 in FIG. 5 represents the shaft voltage V_shaft. Waveform 506 represents the bearing current I(bearing), and waveform 508 represents the leakage or ground current I(ground).

From the foregoing, it will be apparent to those of ordinary skill in the art that common-mode voltages generated by PWM voltage source inverters should be compensated for and/or canceled in order to reduce or eliminate shaft voltages, bearing currents, and leakage currents. As FIG. 2 shows, the common mode voltage appears to have a four-level voltage character; thus, a multi-level inverter can advantageously be used to generate a four-level voltage with polarities opposite those of the common mode voltage, to compensate for the common mode voltage.

Figure 6:
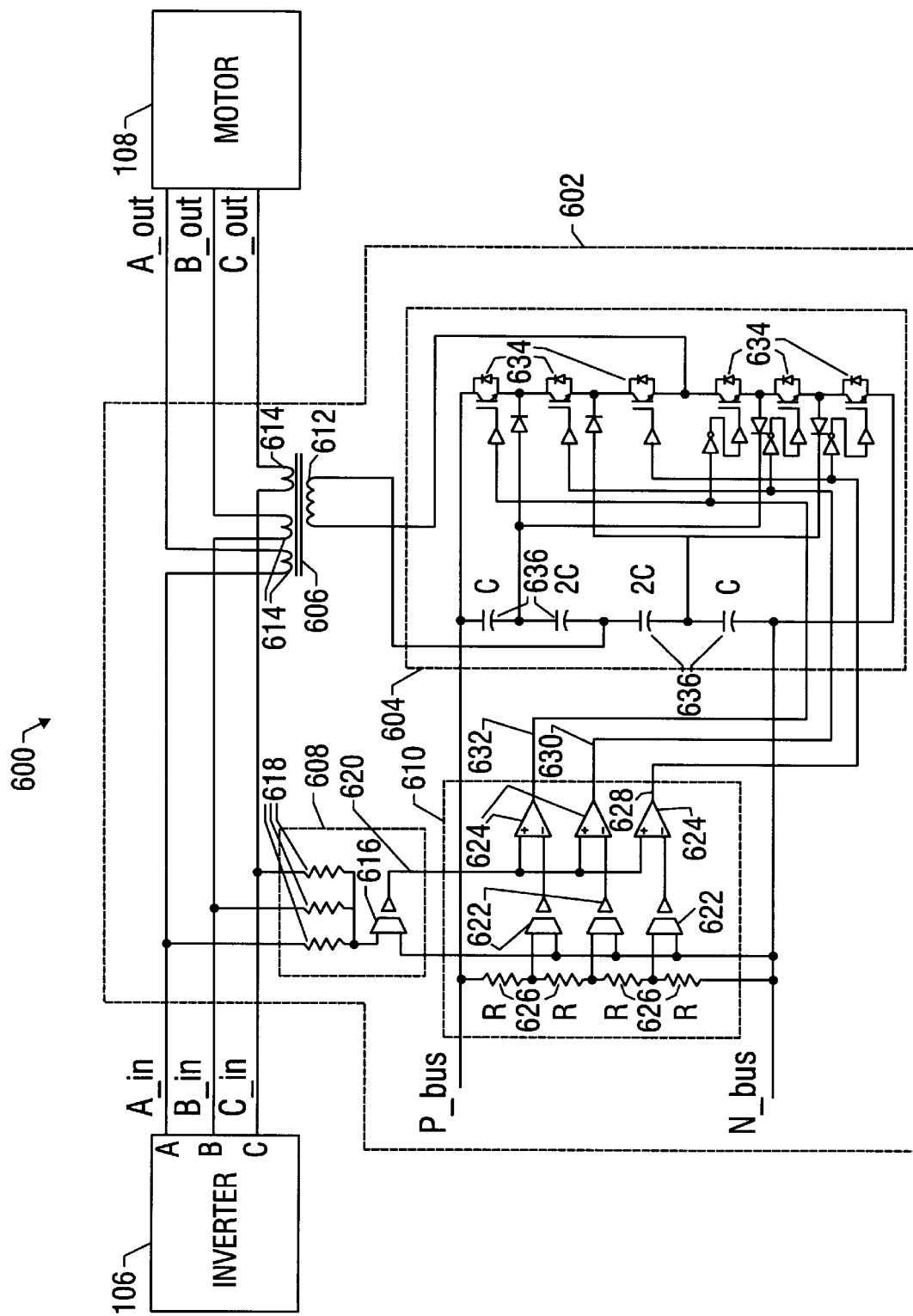
FIG. 6 is a PWM induction motor system including a common mode compensation circuit in accordance with one embodiment of the invention.

Turning now to FIG. 6, there is shown a PWM induction motor system 600 incorporating an active common mode compensation circuit 602 in accordance with one embodiment of the invention. As shown in FIG. 6, compensation circuit 602 is coupled between the three-phase output of inverter 106 and the three-phase input of motor 108.

In the presently disclosed embodiment, compensation circuit 602 comprises a single-phase multi-level half-bridge inverter (SPMHI) circuit 604 and a four winding common mode transformer 606. In one embodiment, SPMHI circuit 604 is controlled by a resistive common mode voltage detection circuit 608 and a three-level comparator circuit 610.

As shown in FIG. 6, transformer 606 has one primary winding 612 and three secondary windings 614, each secondary winding being coupled to a separate one of the three legs of the output of inverter 106. The primary winding is coupled to SPMHI circuit 604.

Figure 7:
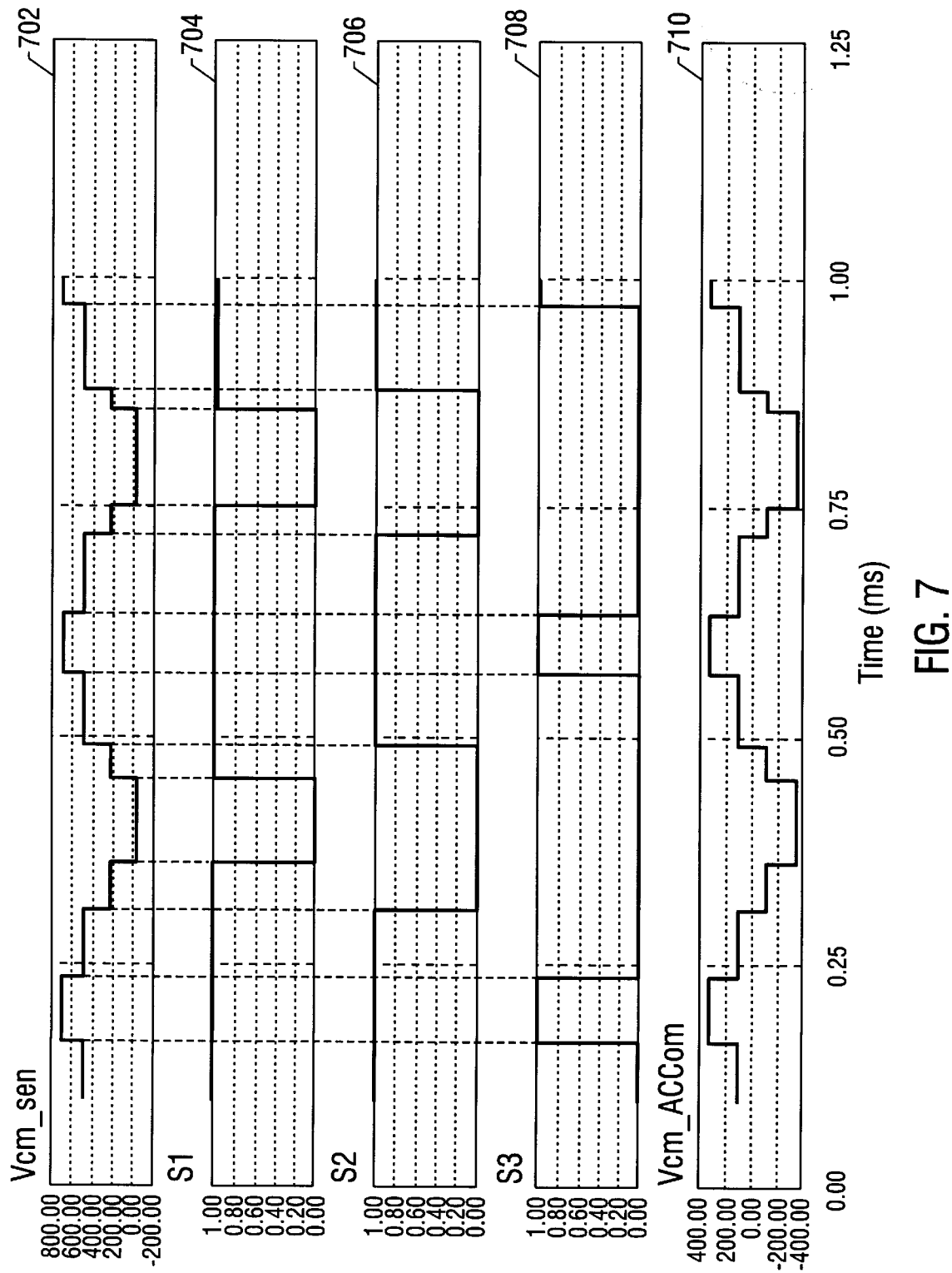
FIG. 7 shows plots of various signals present in the system of FIG. 6.

Operation of compensation circuit 602 in accordance with the presently disclosed embodiment of the invention will perhaps be best understood with reference to the waveforms of FIG. 7 in conjunction with the circuit diagram of FIG. 6.

Common mode voltage detector 608 comprises a differential amplifier 616 having one input commonly coupled, via resistors 618, to the three legs {A, B, C} of the output of inverter 106, and having another input coupled to the negative DC rail (N_bus) of inverter 106. The output of common mode voltage sensor circuit 608, on line 620, therefore, will reveal common mode voltages in the output of inverter 106. This sensor output, a common mode voltage sensing signal designated Vcm_sen in FIG. 7, is represented by waveform 702 in FIG. 7. The common mode voltage sensing signal Vcm_sen has the essentially four-level character previously described with reference to FIG. 2a.

The Vcm_sen sensor output signal is applied to three-level comparator circuit 610. Comparator circuit 610 comprises a plurality of differential amplifiers, a plurality of comparators 624, and a plurality of resistors 626 serially dispose between the positive and negative DC rails (P_bus and N_bus, respectively) from inverter 106. (In an alternative embodiment of the invention, the positive and negative DC signals supplied by the P_bus and N-bus as shown in FIG. 6 can instead by supplied by rectifying the three-phase {A, B, C} output of inverter 106. Resistors 626, functioning as a voltage divider, and differential amplifiers 622 cooperate to generate three reference voltage signals each applied to one input of a different one of the three comparators 624. The common mode sensing signal Vcm_sen is applied to the other input of each comparator 624.

Those of ordinary skill in the circuit art will appreciate how multi-level comparator 610 functions to generate a plurality of gate driving signals S1, S2, and S3 on lines 628, 630, and 632, respectively, reflecting the incremental levels of the common mode voltage in the output of inverter 106.

The gate driving signals S1, S2, and S3 are shown as waveforms 704, 706, and 708, respectively, in FIG. 7. As can be seen in FIG. 7, the level signal S1 (waveform 704) is high whenever the common mode voltage signal Vcm_sen is at anything but its lowest level, whereas the level signal S3 (waveform 708) is high only when Vcm_sen is at its highest level. The level signal S2 (waveform 706) is high only when the common mode voltage signal Vcm_sen exceeds an intermediate level.

The signals S1, S2, and S3 (waveforms 704, 706 and 708, respectively) are applied to the inputs of SPMHI circuit 604. SPMHI 604 comprises a plurality of power semiconductor switches, such as, by way of example but not limitation, MOSFET devices or insulated gate bipolar transistors (IGBTs) or the like coupled between the positive and negative DC rails P_bus and N_bus of inverter 106. Also coupled between the positive and negative DC rails are a plurality of capacitors 636.

Those of ordinary skill in the art will appreciate from FIG. 6 how SPMHI 604, under control of the signals S1, S2, and S3 (waveforms 704, 706, and 708) functions to generate a high dv/dt compensation signal Vcm_ACCom, represented as waveform 710 in FIG. 7.

SPMHI 604 consists essentially of six power semiconductor switches, designated as Q1, Q2, Q3, Q1', Q2', and Q3' in FIG. 6, four diodes, designated as D1, D2, D1' and D2', and four DC capacitors 636. Power semiconductor switches Q1, Q2, Q3, and Q1', Q2', and Q3' comprise fully controllable solid-state devices (such as a MOSFETs or IGBTs) combined with anti-parallel diodes 634. These switches have the capability to conduct bidirectional current and to withstand unidirectional voltage. As will be apparent to those of ordinary skill in the art, switches Q1, Q2, Q3, and Q1', Q2', and Q3' are turned on and off based on gate drive signals S1, S2, and S3. The series-connected four capacitors 636 are used to divide the DC bus voltage V_DC to the desired levels V1=V_DC/3, V2=V_DC/2 and V3=2γ×V_DC/3.

For the purposes of describing the operation of SPMHI 604, assume that S1=1 (high), S2=0 (low), and S3=0 (low). Under these gate driving signals, switches Q1, Q2' and Q3' are off and switches Q1', Q2, and Q3 are on. If the output current of SPMHI 604 is flowing from the output of the output node 605 to the primary of the coupling transformer, node 605 is connected to V1 through Q1' and D1'. On the other side, if the output current of SPMHI 604 is flowing into node 605 from the primary of the coupling transformer, 605 is connected to V1 through Q3, Q2, and D1. Therefore, no matter what is the direction of the output current, the node 605 is connected to V1 and the output voltage Vcm_ACCom=V1−V2=−V_DC/6. Other possible combinations of gate driving signals can be analyzed similarly and the results are summarized in the following Table 1:

TABLE 1

OPERATION OF SPMHI

| GATE DRIVING SIGNALS | | | OUTPUT VOLTAGE |
|---|---|---|---|
| S3 | S2 | S1 | (VCM_ACCom) |
| 0 | 0 | 0 | −V_DC/2 |
| 0 | 0 | 1 | −V_DC/6 |
| 0 | 1 | 1 | V_DC/6 |
| 1 | 1 | 1 | V_DC/2 |

Another possible method for generating the gate driving signals to SPMHI 604 is to use the gate drive signals of the PWM inverter of the drives. In the motor control inverter, the two IGBTs of each phase leg are always turned on or off alternatively. Therefore, a signal switching variable can be used to describe switching status. A value of "1" means that the upper IGBT is on and the lower IGBT is off, while a value of "0" means the upper IGBT is off and the lower IGBT is on. The possible switching pattern of the three phase inverter and the corresponding common mode voltage is listed in the following Table 2, where Sa, Sb, and Sc are designated in FIG. 3.

TABLE 2

COMMON MODE VOLTAGES OF PWM INVERTER

| SWITCHING PATTERN | | | COMMON MODE |
|---|---|---|---|
| Sc | Sb | Sa | VOLTAGE |
| 0 | 0 | 0 | −V_DC/2 |
| 0 | 0 | 1 | −V_DC/6 |
| 0 | 1 | 1 | V_DC/6 |
| 0 | 1 | 0 | −V_DC/6 |
| 1 | 1 | 0 | V_DC/6 |
| 1 | 0 | 0 | −V_DC/6 |
| 1 | 0 | 1 | V_DC/6 |
| 1 | 1 | 1 | V_DC/2 |

Comparing Table 1 and Table 2, the SPMHI gate driving signals can be derived from the PWM inverter gate drive signals as shown in Table 2. The logic shown in the following Table 3 can be implemented in by discrete logic devices, or programmable logic arrays, or by software through a lookup table.

TABLE 3

SPMHI GATE DRIVE SIGNAL GENERATION FROM VSI PWM SIGNALS

| SWITCHING PATTERN OF VSI | | | SWITCHING PATTERN OF SPMHI | | |
|---|---|---|---|---|---|
| Sc | Sb | Sa | S3 | S2 | S1 |
| 0 | 0 | 0 | 0 | 0 | 0 |
| 0 | 0 | 1 | 0 | 0 | 1 |
| 0 | 1 | 1 | 0 | 1 | 1 |
| 0 | 1 | 0 | 0 | 0 | 1 |
| 1 | 1 | 0 | 0 | 1 | 1 |
| 1 | 0 | 0 | 0 | 0 | 1 |
| 1 | 0 | 1 | 0 | 1 | 1 |
| 1 | 1 | 1 | 1 | 1 | 1 |

This VSI PWM signal-based method saves some hardware and simplifies the control circuit of the ACCom. This method is suitable for the new applications by integrating the ACCom to the motor controls.

By using the inherent leakage inductance of the coupling transformer and adding a Y-connected RC circuit as shown in FIG. 6, a low-pass LRC passive filter can be formed. This passive filter will reduce the dv/dt of the differential mode voltage for suppressing the over-voltage ringing at the motor terminal when fed through a long cable.

The compensation signal Vcm_ACCom, essentially follows the common mode signal Vcm_sen, as is apparent from a comparison of waveforms 702 and 710 in FIG. 7.

As a result of the coupling of the Vcm_ACCom output from SPMHI circuit 604 to the primary winding 612 of transformer 606, the common mode compensation signal Vcm_ACCom, which has the same magnitude and opposite direction (i.e., polarity) as the output common mode voltages from the inverter, is fed back into the output of inverter 106, to compensate for the common mode voltage present in that output.

Figure 8:
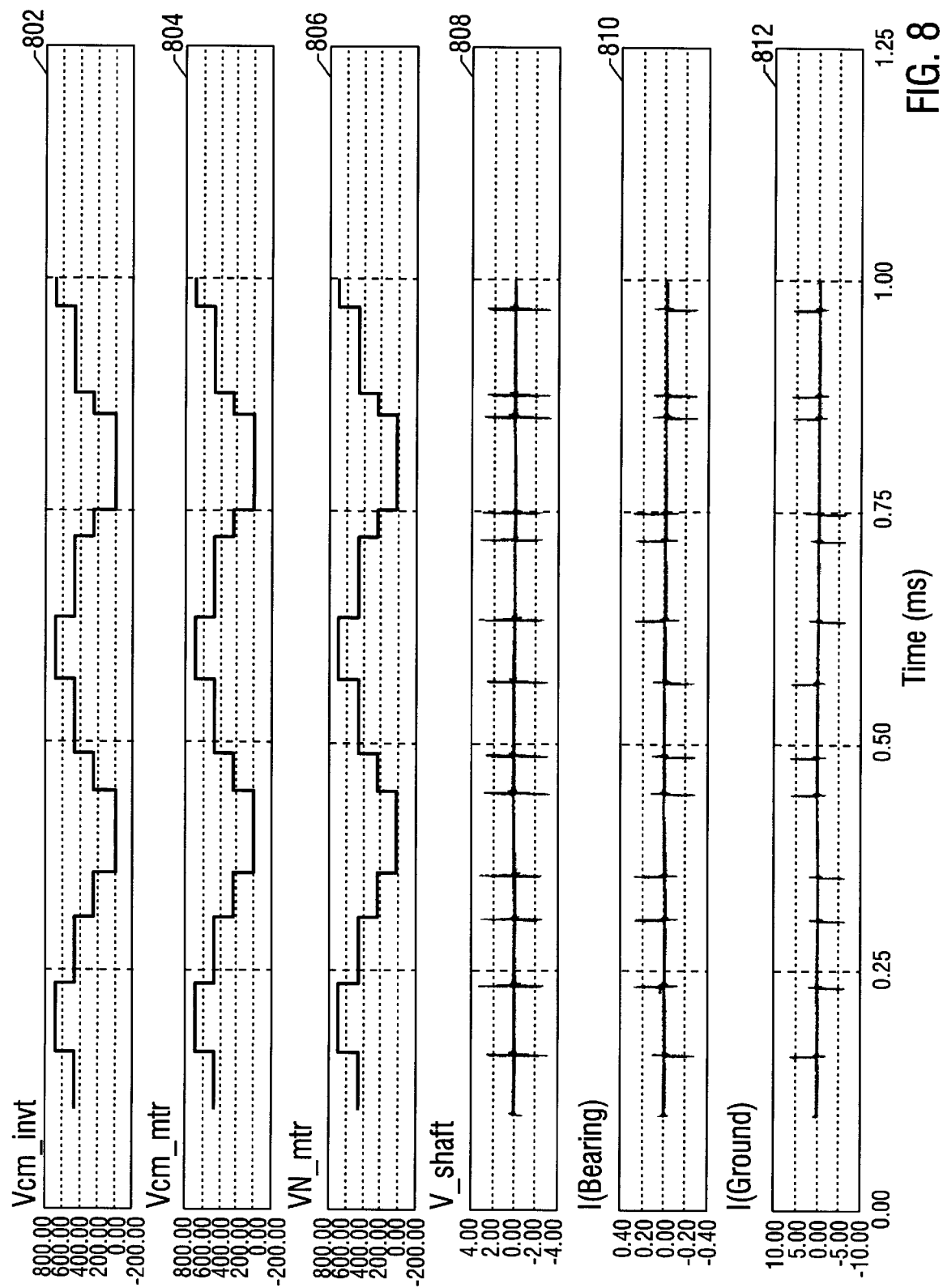
FIG. 8 shows plots of various voltages and currents present in the system of FIG. 6 with the common mode compensation circuit not activated.
Figure 9A:
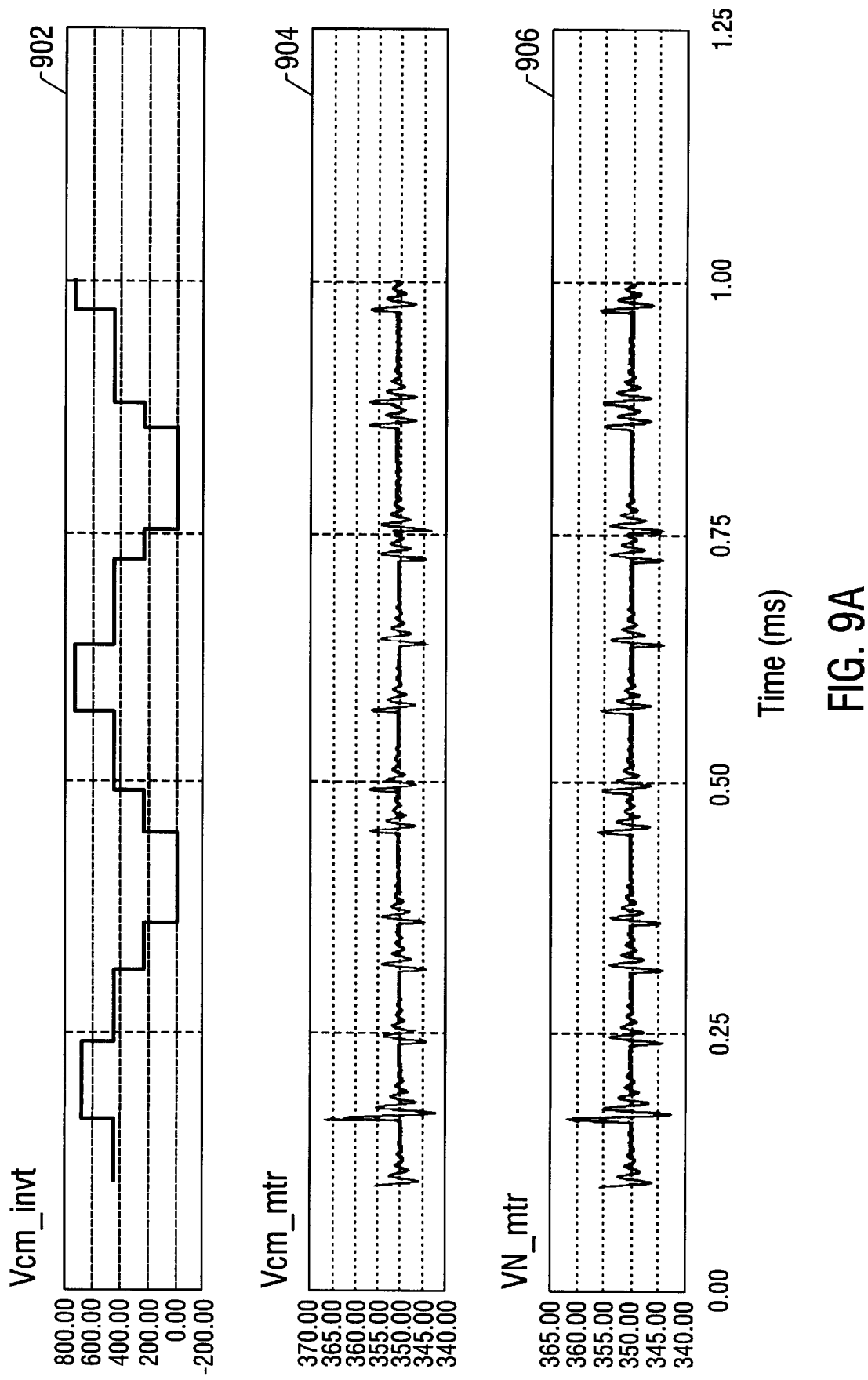
FIG. 9 shows plots of various voltages and currents present in the system of FIG. 6 with the common mode compensation circuit activated.
Figure 9B:
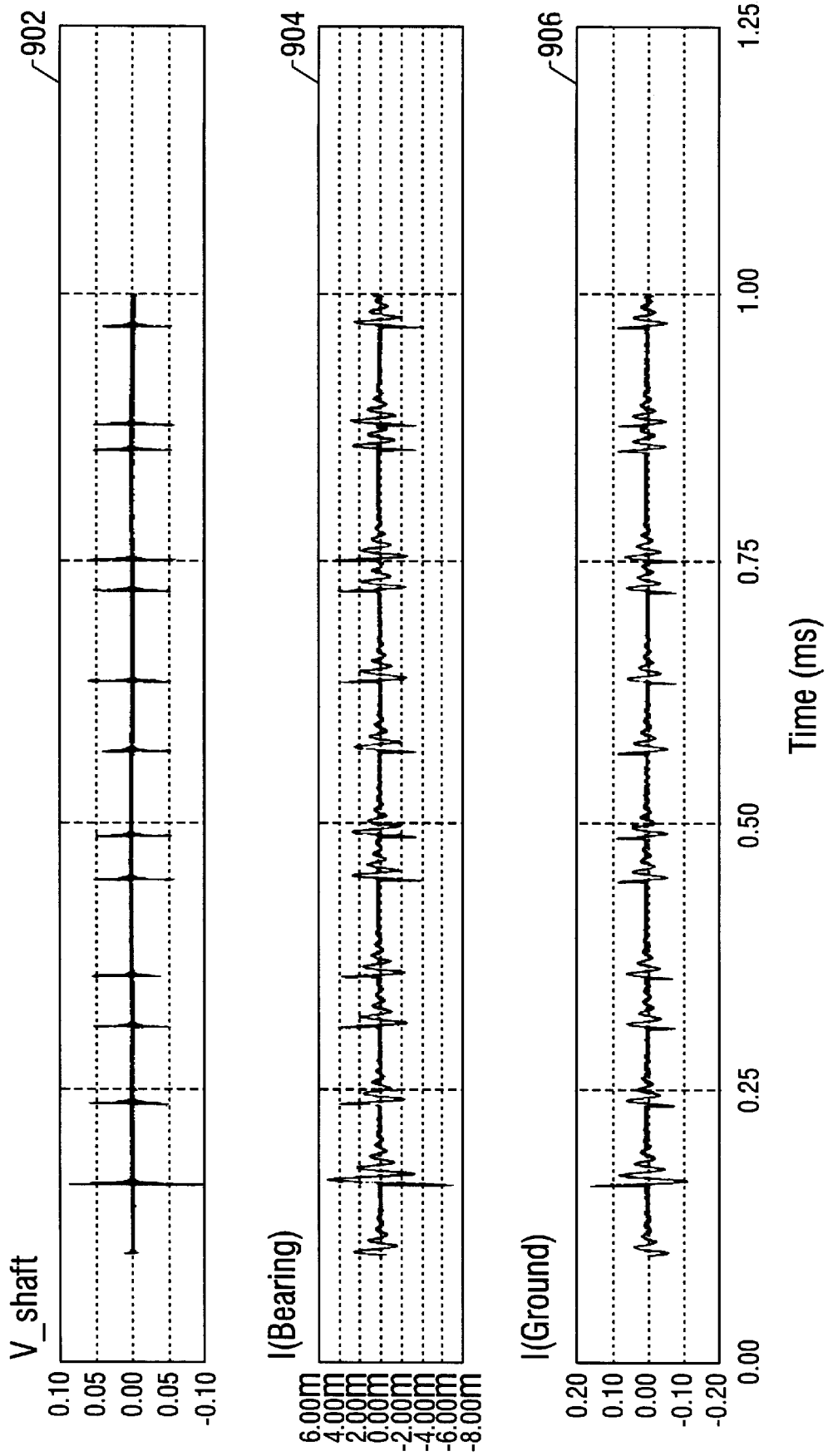

The effects of operation of common mode compensator circuit 602 in accordance with the presently disclosed embodiment of the invention may be best appreciated with reference to FIGS. 8 and 9. FIG. 8 shows various voltages and current in system 600 without operation of compensator circuit 602. In particular, waveform 802 is a signal Vcm_invt representing the common mode voltage of the output of inverter 106 over a period of 1 mSec. Vcm_invt has a peak amplitude of up to 600 volts or so. Since, in the example of FIG. 8, compensator circuit 602 is not operating, waveform 804, representing the common mode voltage Vcm_mtr seen by motor 108, is identical to waveform 802, with peak amplitudes on the order of 600 volts.

Waveform 806 is the neutral-to-ground voltage VN_mtr of motor 108. Again, this signal VN_mtr has peak voltages on the order of 600 volts. Waveform 808 in FIG. 8 is the shaft voltage V_shaft of motor 108, with peak magnitudes on the order of 2–3 volts or so. Waveform 810 represents the bearing current I(bearing), with peak values on the order of 300 milliamps. Finally, waveform 812 represents the leakage or ground current I(ground), with peak values on the order of 6 amps or so.

Turning to FIG. 9, the same waveforms from FIG. 8 are shown in system 600 with compensation circuit 602 activated. As can be seen in FIG. 9, with the same common mode voltage Vcm_invt (waveform 902) in the output from inverter 106, the common mode voltage seen by motor 108, Vcm_mtr (waveform 904), the neutral-to-ground voltage VN_mtr (waveform 806), the shaft voltage V_shaft (waveform 908, bearing current I(bearing) (waveform 910), and ground current I(ground) are all significantly reduced as compared with the corresponding waveforms in FIG. 8.

In particular, in the example of FIG. 9, the peak shaft voltage is reduced from approximately 3 volts to less than 0.1 volt; the peak bearing current is reduced from approximately 300 milliamps to approximately 4 milliamps, and the peak ground current is reduced from 6 amps or so down to approximately 0.1 amp.

It is contemplated that the common mode voltage compensation method and apparatus disclosed herein may be advantageously applied in both low and high voltage drive systems. One advantage of the disclosed embodiment of the invention is that it is relatively simple and uses relatively small rating components. As in the disclosed embodiment, the control circuitry for the compensation circuit can be implemented in dedicated hardware, althought it is believed that those of ordinary skill in the art having the benefit of the present disclosure could readily implement such control circuitry in a microprocessor-based circuit.

In addition, it is contemplated that a compensation circuit in accordance with the present invention may be advantageously implemented as a stand-alone add-on to existing PWM motor drive systems, or alternatively may be incorporated integrally into new PWM motor drive system designs.

From the foregoing detailed description of a specific embodiment of the invention, it should be apparent that a method and apparatus for compensating for common mode voltages in the output of a PWM inverter has been disclosed. Although a specific embodiment of the invention has been described herein in some detail, it is to be understood that this has been done merely to illustrate various features and aspects of the invention, and is not intended to be limiting with respect to the scope of the invention. It is believed that various substitutions, alterations, and/or modifications, including but not limited to those design alternatives that may have been specifically mentioned herein, may be made to the disclosed embodiment of the invention without departing from the spirit and scope of the invention as defined in the claims, which follow.

What is claimed is:

1. A method of compensating for common mode voltage in a three-phase voltage inverter output, comprising:
   (a) applying said three-phase output to a common-mode voltage detector to generate a common mode voltage sensing signal;
   (b) applying said common mode voltage sensing signal to a multi-level comparator to generate a plurality of gate driving signals;
   (c) applying said gate driving signals to a single-phase multi-level half-bridge inverter circuit to generate a compensation signal;
   (d) injecting said compensation signal into said inverter output.

2. A method in accordance with claim 1, wherein said common-mode voltage detector comprises a differential amplifier.

3. A method in accordance with claim 1, wherein said multi-level comparator comprises a three-level comparator, such that three common mode level signals are generated.

4. A method in accordance with claim 1, wherein said step (d) of injecting comprises transformer coupling said compensation signal to said three-phase voltage inverter output.

5. A common-mode voltage compensation circuit, comprising:
   a common mode sensing circuit, adapted to be coupled to a three-phase voltage inverter output to receive a three-phase signal carried on three signal lines, and responsive to common mode voltage in said three-phase signal to generate a common mode sensing signal;
   a multi-level voltage detector, coupled to said common mode sensing circuit and responsive to said common mode sensing signal to generate a plurality of gate driving signals;
   a single-phase multi-level half-bridge inverter circuit, responsive to said gate driving signals to generate a common mode compensation signal.

6. A compensation circuit in accordance with claim 5, further comprising a transformer, coupled to said single-phase multi-level half-bridge inverter circuit and to said voltage inverter output to inject said compensation signal into said three-phase signal.

7. A compensation circuit in accordance with claim 5, wherein said common mode sensing circuit comprises a differential amplifier having a first input commonly coupled to said three signal lines, and having a second input coupled to a DC bus.

8. A compensation circuit in accordance with claim 7, wherein said multi-level comparator comprises three comparators each receiving a reference voltage signal and said common mode sensing signal.

9. A compensation circuit in accordance with claim 8, wherein said single-phase multi-level half-bridge inverter circuit comprises a plurality of semiconductor switches and a voltage divider circuit.

* * * * *

UNITED STATES PATENT AND TRADEMARK OFFICE
CERTIFICATE OF CORRECTION

PATENT NO.    :    5,936,856

DATED         :    August 10, 1999

INVENTOR(S)   :    Youqing Xiang

It is certified that error appears in the above-identified patent and that said Letters Patent is hereby corrected as shown below:

Title page, item [73], the name of the Assignee should correctly read:
Baldor Electric Company Signed and Sealed this Eighth Day of February, 2000

Attest:

Q. TODD DICKINSON

*Attesting Officer*        *Commissioner of Patents and Trademarks*